United States Patent
Köster

(10) Patent No.: US 12,084,131 B2
(45) Date of Patent: Sep. 10, 2024

(54) PRIMARY COUPLING DEVICE AND METHOD FOR CONNECTING A PRIMARY COUPLING DEVICE

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

(*) Notice: Subject to any disclaimer, the term of this patent is extended or adjusted under 35 U.S.C. 154(b) by 524 days.

(21) Appl. No.: 17/424,758

(22) PCT Filed: Mar. 18, 2020

(86) PCT No.: PCT/EP2020/057439
§ 371 (c)(1),
(2) Date: Jul. 21, 2021

(87) PCT Pub. No.: WO2020/200787
PCT Pub. Date: Oct. 8, 2020

(65) Prior Publication Data
US 2022/0135152 A1    May 5, 2022

(30) Foreign Application Priority Data
Apr. 5, 2019    (DE) .............. 10 2019 108 953.0

(51) Int. Cl.
*B62D 53/12* (2006.01)
*B60D 1/01* (2006.01)
*B60D 1/64* (2006.01)

(52) U.S. Cl.
CPC ........... *B62D 53/125* (2013.01); *B60D 1/015* (2013.01); *B60D 1/64* (2013.01)

(58) Field of Classification Search
CPC ......... B62D 53/125; B60D 1/015; B60D 1/64
See application file for complete search history.

(56) References Cited

U.S. PATENT DOCUMENTS 2,924,464 A * 2/1960 Cernoch .............. B62D 53/125
                                                                    280/421
5,346,239 A * 9/1994 Wohlhuter ........... B62D 53/125
                                                                    280/422

(Continued)

FOREIGN PATENT DOCUMENTS

CN       1791528 A      6/2006
CN       1910077 A      2/2007

(Continued)

OTHER PUBLICATIONS

Anonymous; "Fluid-Wikipedia"; Nov. 27, 2018, Retrieved from the Internet: https://de.wikipedia.org/w/index.php?title=Fluid&direction=prev&oldid=188062001 [retrieved on May 27, 2020] XP055698959; Whole Document.

(Continued)

*Primary Examiner* — Kevin Hurley
*Assistant Examiner* — Marlon A Arce
(74) *Attorney, Agent, or Firm* — Price Heneveld LLP

(57) ABSTRACT

A fifth-wheel coupling arrangement includes a primary coupling device of a fifth wheel coupling arrangement or a trailer, in particular a semi-trailer, wherein the primary coupling device includes a base body, a drive and a connector element, wherein the base body is configured to be fixed to the fifth wheel coupling arrangement or the trailer, and wherein the connector element (is configured to be displaceable relative to the base body by the drive in a displacement direction.

16 Claims, 2 Drawing Sheets

(56) References Cited

U.S. PATENT DOCUMENTS

| | | | | |
|---|---|---|---|---|
| 8,066,298 | B2* | 11/2011 | Alguera | B62D 53/125 |
| | | | | 280/421 |
| 8,505,949 | B2* | 8/2013 | Temple | B60D 1/64 |
| | | | | 280/421 |
| 11,099,560 | B2* | 8/2021 | Smith | B60R 25/04 |
| 2007/0114759 | A1 | 5/2007 | Biondi et al. | |
| 2011/0037241 | A1 | 2/2011 | Temple et al. | |
| 2020/0001669 | A1* | 1/2020 | Metternich | B62D 53/08 |
| 2023/0211837 | A1* | 7/2023 | Köster | B60D 1/64 |
| | | | | 280/434 |

FOREIGN PATENT DOCUMENTS

| | | |
|---|---|---|
| DE | 29616253 U1 | 11/1996 |
| DE | 10155056 A1 | 6/2003 |
| DE | 202004000387 U1 | 6/2004 |
| EP | 1900620 A1 | 3/2008 |
| JP | S58181604 U | 12/1983 |
| WO | 2007012085 A2 | 1/2007 |
| WO | 2008009660 A1 | 1/2008 |

OTHER PUBLICATIONS

European Patent Office, International Search Report; May 27, 2020; Whole Document.

* cited by examiner

PRIMARY COUPLING DEVICE AND METHOD FOR CONNECTING A PRIMARY COUPLING DEVICE

BACKGROUND OF THE INVENTION

The invention relates to a primary coupling device, in particular for an automatic coupling system, for a commercial vehicle, a fifth wheel coupling arrangement and a method for connecting a primary coupling device to a secondary coupling device.

Automatic coupling systems are already known from the state of the art, these serve to realise a power flow between a towing vehicle and a semi-trailer or trailer. These automatic coupling systems usually have a connector on the towing vehicle side and a socket on the trailer side. By approaching the towing vehicle relative to the trailer—during the coupling process—the socket and the connector are aligned and simultaneously connected to each other so that energy, in particular a current, can flow from the towing vehicle to the trailer. However, this process of automatically coupling the socket and the connector is relatively fragile and, especially when the towing vehicle is approaching the trailer quickly, will result in the connector and the socket not being "properly" connected, so that the automatic coupling system can be damaged and/or that no energy transfer can take place between the trailer and the towing vehicle.

It is therefore the object of the present invention to provide a secure connection and alignment in an automatic coupling system.

SUMMARY OF THE INVENTION

The invention relates to a primary coupling device of a fifth wheel coupling arrangement or a trailer, in particular a semi-trailer, wherein the primary coupling device comprises a base body, a drive and a connector element, wherein the base body is adapted to be fixed to the fifth wheel coupling arrangement and/or the trailer, wherein the connector element is displaceable relative to the base body by means of the drive, in particular in a displacement direction. The primary coupling device is in particular a primary coupling device for a commercial vehicle. A commercial vehicle in the sense of the invention is in particular a roadworthy vehicle with a gross vehicle weight of at least 3.51 tonnes, preferably of at least 7.51 tonnes and particularly preferably of at least 15.01 tonnes. In other words, the primary coupling device may be part of an automatic coupling system which serves to automatically connect a trailer vehicle to a towing vehicle in terms of energy technology and/or information technology. The primary coupling device according to the invention may be that part of the automatic coupling system which is arranged on the fifth wheel coupling arrangement or the primary coupling device may form that part of the automatic coupling system which is arranged/mounted on the trailer, in particular pivotably about a king pin of the trailer. The primary coupling device according to the invention comprises a base body, a drive and a connector element. The base body serves to be fixed to the fifth wheel coupling arrangement or the trailer. The base body may, for example, be reversibly fixed, in particular by means of screws, so that it can be replaced in a simple manner. For example, when fixed to the fifth wheel coupling arrangement, the main body may be located on the fifth wheel coupling plate. Preferably, the base body is located below the entry opening of the fifth wheel coupling plate. The entry opening of the fifth wheel coupling plate is the opening into which the king pin to be coupled or to be engaged is inserted when the king pin is moved from an uncoupled position to the coupled position. In other words, this may mean that the entry opening is the opening in the fifth wheel coupling plate into which the king pin is inserted to achieve coupling of the king pin. Advantageously, the entry opening is defined/formed by a space between the coupling horns of the fifth wheel coupling plate. The base body of the primary coupling device can in particular be designed as a sheet metal part, as this can save manufacturing costs. In addition to the base body, the primary coupling device also has a connector element. The connector element serves to be connectable and/or connected to a correspondingly designed element, in particular to a connector device of a secondary coupling device, so that electrical signals and/or information and/or energy can be transmitted between the connector element and the correspondingly designed element. In other words, this can mean that the connector element can form an automatic coupling system with, for example, a connector device of a secondary coupling device, so that in particular electrical signals and/or energy and/or information can be transmitted between a towing vehicle and a trailer. For the transmission of information and/or energy, the connector element has, in particular, hydraulic and/or pneumatic and/or electrical contacts, the contacts being designed, in particular, to be connectable and/or connected to corresponding contacts of a connector device of a secondary coupling device. Advantageously, the contacts of the connector element extend in the displacement direction. Advantageously, the connector element is supported within the primary coupling device in a displaceable manner relative to the base body. For example, this supporting of the connector element can be achieved by one or a plurality of linear guides. Alternatively preferably, it can also be provided that the base body itself forms the guide unit, so that the connector element is not supported by separate linear guides, but only by the base body. Should the primary coupling device be a primary coupling device of a trailer, it is expedient if the base body is supported, advantageously rotationally, relative to the king pin of the trailer, in particular by the use of a support arm or a support structure. Irrespective of whether the primary coupling device is attached to a fifth wheel coupling arrangement or a trailer, it is preferred if the base body and/or the connector element is/are arranged below the king pin, in particular in the direction of the extension of the king pin. This prevents the king pin from colliding with parts of the primary coupling device, in particular the base body, the drive and/or the connector element, during the coupling process. Preferably, the drive of the primary coupling device is at least partially enclosed by the base body. By enclosing the drive of the primary coupling device by the base body in this way, it can be achieved that this drive is protected against damage and/or against other external influences. The drive of the primary coupling device serves to achieve a displacement of the connector element relative to the base body. In particular, this drive is designed in such a way that it enables the connector element to be displaced relative to the base body in the direction of a translatory direction, which is in particular the displacement direction. The displacement direction is advantageously the direction in which the connector element must move in order to engage with a connector device of a secondary coupling device of the automatic coupling system. Alternatively or additionally preferably, the displacement direction is oriented such that it is parallel to the direction of extension of the entry opening of the fifth wheel coupling plate. By providing a drive in the primary coupling device, it is achieved that the alignment process can be performed separately from the actual connection of the connector element—to the corresponding connector device of a secondary coupling device of the automatic coupling system. In other words, this can mean that due to the drive it is possible that the actual connection of the connector element can be performed in a separate operation—for aligning the connector element and/or the connector device. By separating the two operations in this way, it can be ensured that in particular the alignment is completed before the actual connection of the connector element to the corresponding counterpart of the automatic coupling system takes place, so that the primary coupling device according to the invention is able to achieve a particularly safe automatic coupling.

Advantageously, the drive has an energy connection. Such an energy connection can be, for example, an electricity connection, an oil connection and/or an air pressure connection. By providing the energy connection, it is possible to specifically bring about an actuation of the drive in order to achieve a displacement of the connector element relative to the base body, in particular in the displacement direction.

Preferably, the drive is a pneumatic, electric or hydraulic drive. By designing the drive as a hydraulic drive, it is possible to exert large forces. If the drive is designed as a pneumatic drive, it is possible to ensure that no environmental pollution occurs, in particular in the event of leakage. In addition, the design of the drive as a pneumatic drive also has the advantage that in particular existing (supply) systems of the commercial vehicle (towing vehicle or trailer) can be used to operate the drive. The provision of a hydraulic or pneumatic drive also has the further advantage that, due to the compressibility of the working fluid, the drive can be given a certain spring stiffness, so that overloading of the drive and/or the base body and/or the connector element can be prevented by the spring stiffness of the working fluid. The use of an electric drive also enables the use of energy sources, such as batteries, of the trailer or the towing vehicle to achieve operation of the drive. This results in a particularly cost-effective system, because the energy supply of the drive can be retrofitted and/or designed particularly easily.

Advantageously, the drive is a hydrostatic drive. A hydrostatic drive is characterised in particular by the fact that this type of drive is based on the principle of displacement. Therefore, the operating principle of a hydrostatic drive is in particular characterised by the fact that a fluid displaces a volume and that the fluid is thereby in particular under high pressure. In other words, this may mean that in particular converters or other types of dynamic hydraulic drives do not constitute hydrostatic drives. For example, the drive may be a radial piston motor, a gear motor or a vane motor. To convert the movement of the rotor of the motor into a linear movement, a spindle drive may be provided, for example. In order to achieve the fastest possible displacement of the connector element to the base body, it is advantageous if the spindle drive has a multi-start threaded drive. Alternatively or additionally preferred, the displacement of the connector element to the base body can also be carried out by means of a gear rack.

Alternatively or additionally preferred, the drive can also be designed as a single-acting cylinder. This type of design has the particular advantage that further gear elements can be dispensed with, resulting in a particularly space-saving and cost-effective primary coupling device. It is preferable if the drive is designed as a double-acting cylinder, because by designing it as a double-acting cylinder, a displacement in both positive and negative direction can be achieved, so that the drive can realise/perform both an "insertion" and an "unplugging" of the connector element.

In a preferred embodiment, the drive is a compressed air cylinder. The design as a compressed air cylinder results in a particularly space-saving primary coupling device, which is also leak-proof with regard to environmental pollution. In addition, the use of a compressed air cylinder makes it possible to move particularly quickly and to use existing systems for operating or supplying the drive, such as compressors and/or compressed air tanks of the towing vehicle or the trailer. Preferably, the compressed air cylinder is coupled to a spring member such that the spring member is arranged to displace the connector element relative to the base body in one displacement direction and the air cylinder is arranged to displace the connector element relative to the base body in the other displacement direction. In other words, this can mean that in one (for example) positive displacement direction the connector element is displaced by the application of pressure from the compressed air cylinder and in the (for example) negative displacement direction the connector element is displaced relative to the base body by the spring element. In this way, it can be achieved that, in particular in the event of a power failure, a safe application of force to the connector element is always provided. In particular, this embodiment is designed in such a way that the spring element ensures that the connector element is spaced apart from the base body. In other words, this can mean that the spring element always has more mechanical tension when the connector element is in the "unplugged/unconnected" position relative to the base body. This can ensure, for example, that—even if the compressed air cylinder is no longer supplied with compressed air—the connector element is still securely placed so that energy and/or information can still be securely transferred from the towing vehicle to the trailer vehicle. Advantageously, the piston rod of the compressed air cylinder forms part of a linear guide which serves to support the connector element relative to the base body, in particular perpendicular to the displacement direction. In other words, the piston rod of the air cylinder can serve to support the connector element perpendicular to the displacement direction relative to the base body. It should be emphasised here that this type of design of the linear guide and the connector element can also be used for other types of actuators that use a pressure cylinder, for example a hydraulic cylinder.

Advantageously, the primary coupling device comprises a second drive. The use of a second drive can, for example, serve to provide a redundant system so that a safe displacement of the connector element relative to the base body can continue to take place even if one drive fails. Alternatively or additionally preferably, the second drive can also be designed to displace the connector element only in the positive displacement direction and the drive can be designed to displace the connector element in the negative displacement direction. The positive displacement direction is in particular the direction in which the connector element distances itself from the base body during the "plug-in process". In other words, the displacement direction points in particular from the position of the connector element in an unplugged position to the position of the connector element in a plugged-in position in which the connector element is connected, for example, to a connector device of a secondary coupling device.

Advantageously, the first drive and the second drive are arranged in parallel. In this way, a particularly redundant system can be achieved. Parallel means that the effective movement of the first drive is parallel to the effective movement of the second drive. For example, two cylinders are parallel to each other when the two cylinder axes are parallel to each other.

Preferably, the primary coupling device is designed in such a way that the connector element is displaceable, in particular only, by the drive and/or by the second drive and/or by one or more spring elements. In other words, this can mean that a displacement of the connector element relative to the base body can be accomplished exclusively by the first drive and/or by the second drive and/or by further drives and/or by one or more spring elements. For example, this can be achieved by having a braking device and/or a locking device which ensures that the connector element cannot be displaced without using the drive. By exclusively displacing the connector element by means of the drive, it can be ensured that only a deliberate and/or targeted displacement of the connector element takes place. This can therefore also increase the safety of the system.

Preferably, the connector element comprises hydraulic and/or pneumatic and/or electrical contacts, said contacts being adapted to be connectable and/or connected to corresponding contacts of a connector device of a secondary coupling device. The connector element therefore comprises, in other words, hydraulic and/or pneumatic and/or electrical contacts which can interact and/or be connected with corresponding contacts of a connector device of a secondary coupling device in such a way that energy and/or information in the form of electrical, pneumatic and/or hydraulic energy can be transmitted from the connector element to the connector device and thus, in a subsequent installation position, from the trailer to the towing vehicle or from the towing vehicle to the trailer. The secondary coupling device with its connector device therefore forms, in other words, an automatic plug-in connection system of an automatic coupling system with the primary coupling device, wherein the primary coupling device is arranged on the trailer or on the towing vehicle and the secondary coupling device is accordingly arranged on the towing vehicle or on the trailer.

A further aspect of the invention relates to a fifth wheel coupling arrangement comprising a primary coupling device, in particular as described above and below, and a fifth wheel coupling plate, wherein the fifth wheel coupling plate has a semitrailer surface, wherein the semitrailer surface has an outwardly facing normal, wherein advantageously the connector element and/or the base body is/are mounted movably in a direction perpendicular to the displacement direction, in particular in the direction of the normal of the semitrailer surface and/or in a transverse direction, in particular mounted movably by 5 mm. The transverse direction is perpendicular to the normal of the semitrailer surface as well as perpendicular to the displacement direction. Alternatively or additionally preferably, the connector element can also be mounted so as to be movably in the direction of the normal of the semitrailer surface. The semitrailer surface of the fifth wheel coupling plate is the surface on which the semitrailer rests directly or indirectly in the coupled state. Further preferably or alternatively, the connector element can also be mounted movably in the displacement direction, in particular by means of a spring element. Advantageously, this spring element is mechanically connected in series with the drive or one spring element in series with a drive. This movability of the connector element and/or of the base body makes it possible to compensate for inaccurate positioning. The movable mounting can be achieved, for example, by the connector element being spring-mounted relative to the linear guides.

Alternatively or additionally preferably, the base body can also be displaceably mounted relative to the fifth wheel coupling plate, for example by the use of a rubber mounting. Advantageously, both the base body and the connector element are mounted so as to be movable perpendicularly to the displacement direction in such a way that the two directions perpendicular to each other, which are also perpendicular to the displacement direction, each form directions in which the base body and/or the connector element are/is movable. Alternatively preferred, the connector element can also be arranged to be rotationally rigid. This enables a particularly mechanically secure mounting of the connector element.

Advantageously, the connector element and/or the base body is/are mounted pivotably in a direction about the normal and/or perpendicularly about the normal, in particular by a minimum of +/−5°, preferably by a minimum of +/−10°. This rotational displaceability of the connector element and/or the base body—in relation to the fifth wheel coupling plate—makes it possible to compensate for a certain positional deviation of the primary coupling device in relation to the secondary coupling device without causing damage. Advantageously, the connector element is mounted so that it can swivel around three axes that are perpendicular to each other. In this way, a particularly flexible fifth wheel coupling arrangement can be achieved. Alternatively or additionally preferably, the bearing can be mounted, in particular exclusively, so as to be pivotable about the normal of the semitrailer surface and/or about the displacement direction and/or about the transverse direction. In this way, a particularly safe and cost-effective bearing can be provided, because the rotation-free bearing in one or several directions allows a particularly simple bearing to be provided. Advantageously, this displaceability extends about the normal of the semitrailer surface and/or about the directions perpendicular thereto or standing upright thereto by +/−10°, wherein the zero point of this displaceability—during the rotation about the normal—lies in particular in the direction of the extension of the entry opening of the fifth wheel coupling plate. In other words, this can mean that the connector element and/or the base body can be pivoted +/−10° from the centre of the entry opening. This allows for a particularly secure engagement of the connector element with the connector device, as a particularly wide range of angles is covered. Particularly preferably, the connector element and/or the base body can be pivoted in one direction around the normal by a minimum of +/−5°, because this results in a particularly space-saving fifth wheel coupling arrangement, which can also provide a certain degree of compensation during coupling.

Another aspect of the invention relates to a method for connecting power lines of/at the fifth wheel coupling arrangement and power lines of a trailer, wherein the trailer comprises a king pin and a secondary coupling device, wherein the fifth wheel coupling arrangement comprises a fifth wheel coupling plate and a primary coupling device, in particular as described above, wherein the king pin is being displaced from an uncoupled position to a coupled position relative to the fifth wheel coupling plate, in particular by a drive, and wherein the primary coupling device is being connected to the secondary coupling device. The secondary coupling device is the counterpart to the primary coupling device in an automatic coupling system. In other words, this may mean that the primary coupling device is that part of the automatic coupling system which is mounted on the fifth wheel coupling arrangement and the secondary coupling device is that part which is mounted on the trailer, in particular pivotably around the king pin. The uncoupled position of the king pin—relative to the fifth wheel coupling arrangement—are those positions of the king pin in which it is not fully inserted into the entry opening. In other words, the uncoupled positions of the king pin are those positions in which the king pin can be located when it is not located in the fifth wheel coupling arrangement. The coupled position, on the other hand, is in particular the position in which the king pin is located relative to the fifth wheel coupling arrangement when the king pin is fully inserted into the entry opening of the fifth wheel coupling plate. Preferably, when the king pin is in the coupled position, it is no longer possible for the king pin to exit the entry opening of the fifth wheel coupling plate. For example, this can be achieved by the fifth wheel coupling arrangement having a locking mechanism which prevents the king pin from exiting the entry opening in the coupled position. This prevention of the king pin from exiting takes place in particular in a form-fitting manner, for example by means of a locking claw of the fifth wheel coupling arrangement. By connecting the primary coupling device, in particular the connector element, to the secondary coupling device, in particular to the connector device, it can be achieved that an energy and/or information transmission possibility, in particular in the form of a current, a hydraulic flow and/or a compressed air flow, can be established between the primary coupling device and the secondary coupling device. In particular, this connection is made in such a way that the connector element of the primary coupling device is displaced relative to the base body, in particular in the displacement direction, so that the line elements of the connector element can be brought into energy-conducting engagement with the corresponding line elements of the connector device of the secondary coupling device. For this purpose, the connector device and/or the connector element can preferably have electrical, pneumatic and/or hydraulic contacts. It is particularly preferred if the connector element and/or the connector device have guide ramps corresponding to each other, which are advantageously designed as centring ramps, so that a secure connection can be established between the connector device and the connector element.

In an advantageous embodiment, 0.1 to 0.5 seconds before the king pin is placed in the coupled position and/or when the king pin contacts a lock jaw of the fifth wheel coupling arrangement, the drive is being activated and/or the primary coupling device is being connected to the secondary coupling device. This type of activation ensures that an energy-conducting connection between the trailer and the towing vehicle is/is established directly when the king pin reaches the coupled position.

In an advantageous embodiment, after placing the king pin in the coupled position, the primary coupling device is being connected to the secondary coupling device. In other words, this may mean that the king pin is first brought into the coupled position relative to the fifth wheel coupling arrangement and only then is the primary coupling device connected to the secondary coupling device. This connecting is done in particular, as already described, by the use of the/an actuator. In other words, this may mean that the connection of the primary coupling device to the secondary coupling device takes place in a separate method step after the mechanical coupling of the king pin. By separating the alignment step from the step of connecting the primary coupling device to the secondary coupling device, the safety of the automatic connection can be increased, as the connection only takes place after a safe alignment.

BRIEF DESCRIPTION OF THE DRAWINGS

Further advantages and features of the present invention result from the following description with reference to the figures. Individual features of the embodiments shown can also be used in other embodiments, unless this has been expressly excluded.

DETAILED DESCRIPTION OF THE PREFERRED EMBODIMENTS

Figure 1:
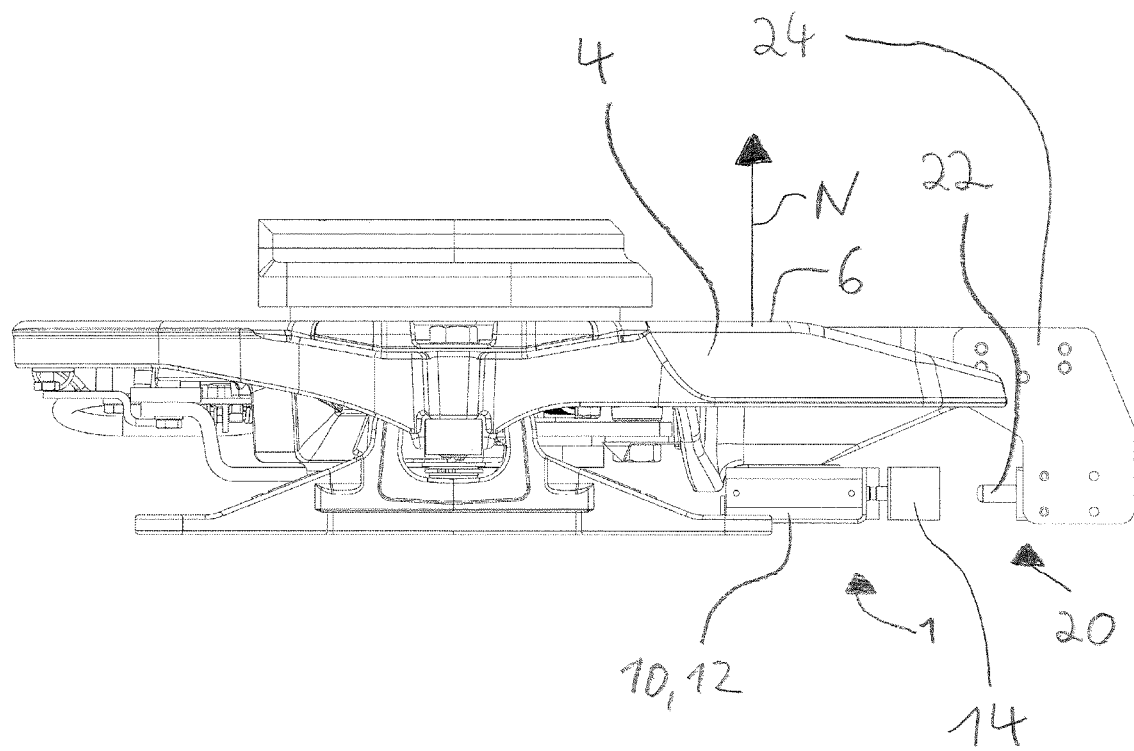
FIG. 1 is a side elevation view of an automatic coupling system with a primary coupling device according to the invention.

FIG. 1 shows an automatic coupling system comprising a primary coupling device 1 and a secondary coupling device 20. The primary coupling device 1 comprises a base body 10 which encloses a drive 12. The primary coupling device 1 also has a connector element 14. This connector element 14 is displaceable by the drive 12, so that the contacts present in the connector element 14 can be brought into engagement, in an energy-conducting and/or information-transmitting manner, with the contacts, in particular of corresponding design, of the connector device 22 of the secondary coupling device 20. The connector device 22 of the secondary coupling device 20 is rotatably mounted about the king pin 8 via the support arm 24. The primary coupling device 1 is arranged below the entry opening 5 of the fifth wheel coupling plate 4 and is reversibly arranged on a transverse connector 7 of the fifth wheel coupling plate 4. Below the entry opening 5 means in particular that the primary coupling device 1 is arranged opposite the outwardly pointing normal N of the semitrailer surface 6 below the entry opening 5 of the fifth wheel coupling plate 4. The semitrailer surface 6 of the fifth wheel coupling plate 4 is, in particular, the surface on which the semitrailer rests when the trailer is coupled.

Figure 2:
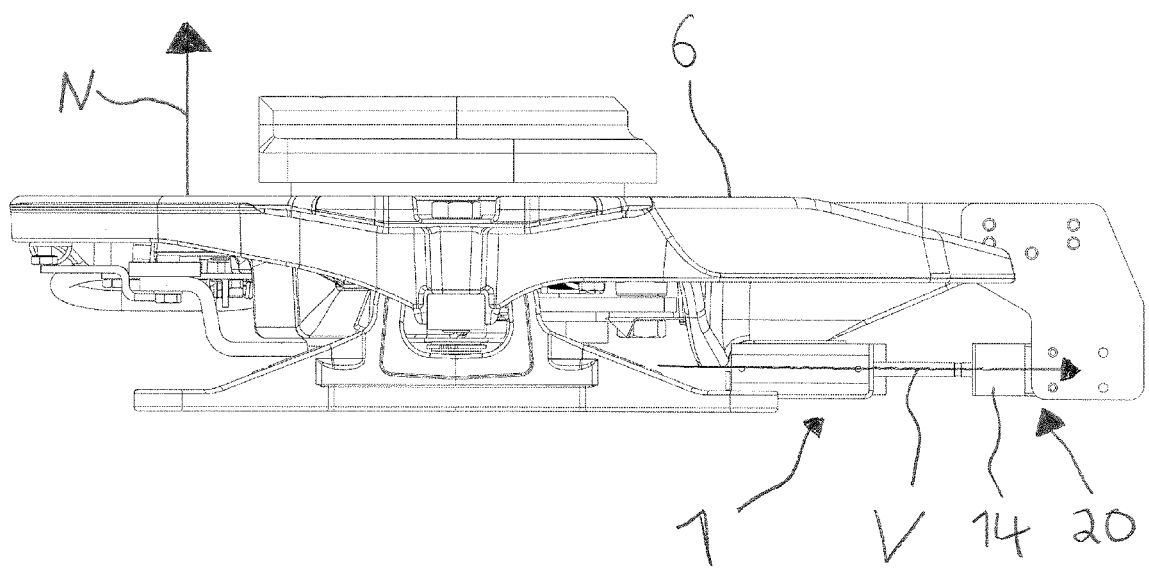
FIG. 2 is another side elevation view of an automatic coupling system with a primary coupling device according to the invention.

FIG. 2 shows the same embodiment as in FIG. 1, wherein in FIG. 2 the connector element 14 is connected to the connector device 22 (coupled state with connected connector element 14). This connection is effected in that the connector element 14 is (has been) displaced along the displacement direction V by the drive 12 relative to the base body 10. The connector element 14 is mounted in such a way that it can be displaced in the displacement direction V and/or in the direction of the normal N of the semitrailer surface 6, in particular by +/−3 mm. Alternatively or additionally preferably, the connector element 14 can also be mounted so that it can be displaced in a direction perpendicular to the displacement direction V and perpendicular to the normal N, in particular by +/−3 mm. It is particularly preferred if the connector element 14 is alternatively or additionally preferably also rotatably mounted about this direction.

Figure 3:
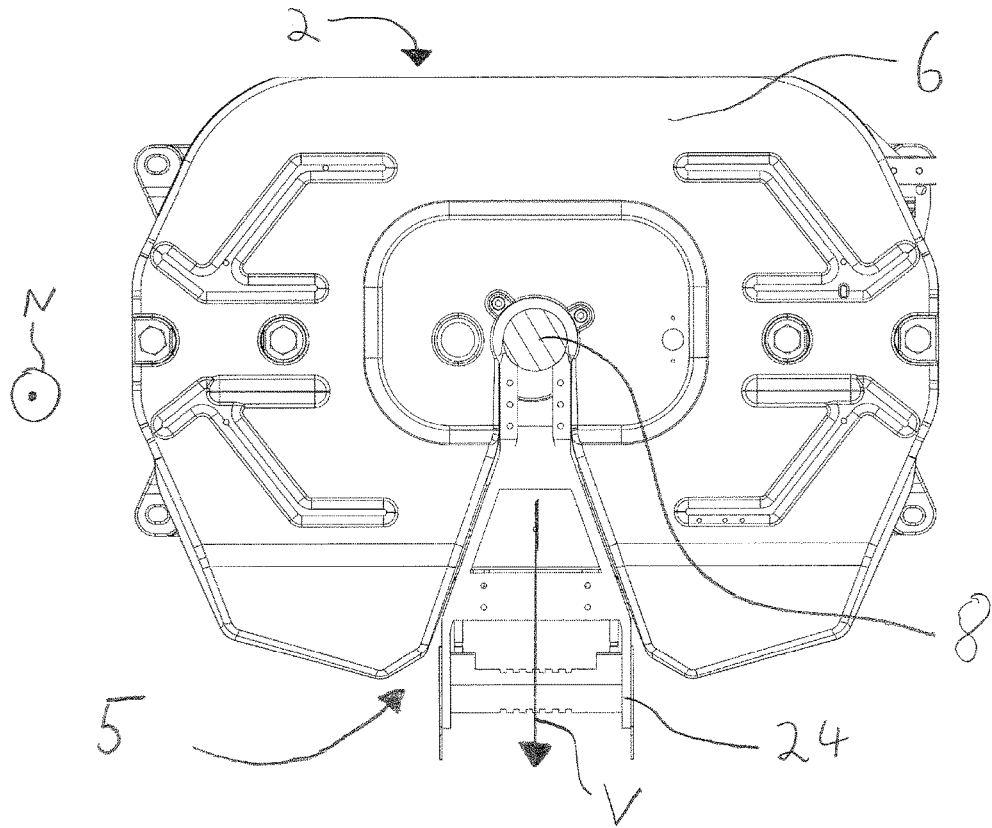
FIG. 3 is a top plan view of a fifth wheel coupling arrangement and king pin in the coupled condition.

FIG. 3 shows a section through the automatic coupling system in the engaged state. As can be seen from FIG. 3, in the embodiment shown, the king pin 8 is fully inserted into the entry opening 5. In addition, the support structure 24 also extends into the entry opening 5 of the fifth wheel coupling plate 4. The entry opening 5 extends along the displacement direction V, which in turn is perpendicular to the normal N of the semitrailer surface 6.

Figure 4:
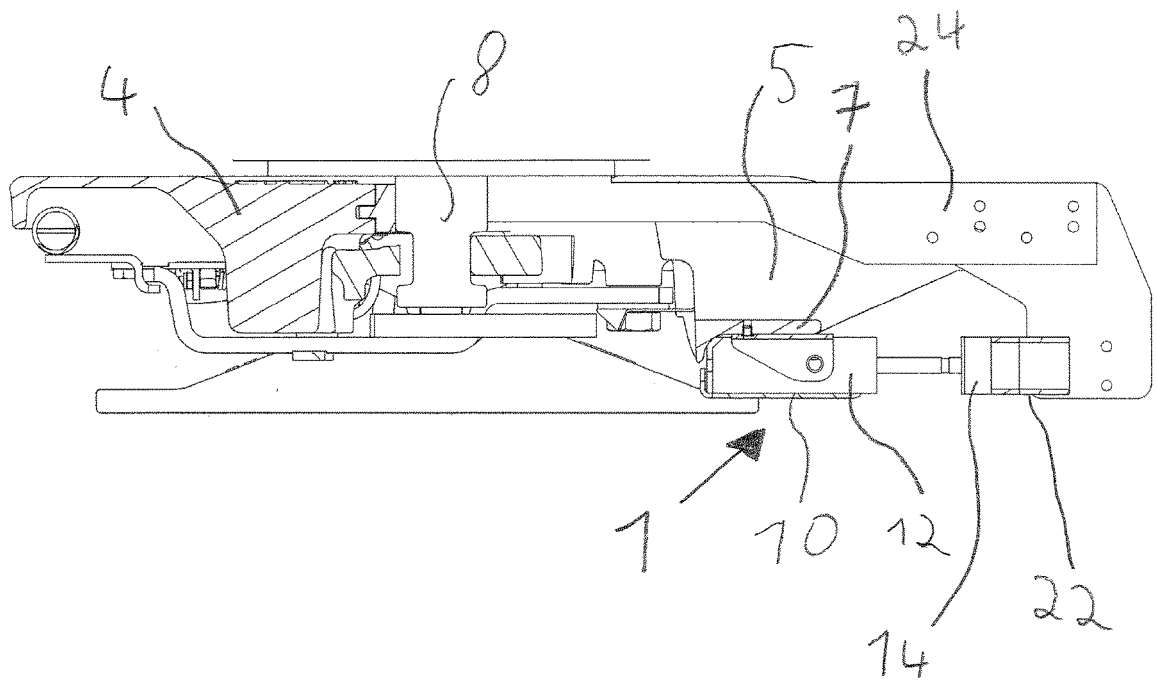
FIG. 4 is a cross-section side elevation view of an automatic coupling system comprising a primary coupling device according to the invention.

FIG. 4 shows a further sectional view through an automatic coupling system for a commercial vehicle system consisting of a commercial vehicle trailer and a commercial vehicle tractor. In the situation shown, the automatic coupling system is in the coupled state. In the embodiment shown in FIG. 4, the king pin 8 is prevented from exiting the entry opening 5 of the fifth wheel coupling plate 4 in a positive-locking manner. The drive 12 of the primary coupling device 1 is arranged within the base body 10, the base body 10 being realised by a sheet metal construction. In the state shown, the connector element 14 is connected to the connector device 22, the connector device 22 being rotatably mounted about the king pin 8 by the support structure 24.

LIST OF REFERENCE SIGNS 1 primary coupling device
2 fifth wheel coupling arrangement
4 fifth wheel coupling plate
5 entry opening
6 semitrailer surface
7 transverse connector
8 king pin
10 base body
12 drive
14 connector element
20 secondary coupling device
22 connector device
24 support structure/support arm
N normal of the semitrailer surface (6)
V displacement direction

The invention claimed is:

1. A fifth wheel coupling arrangement, comprising:
a primary coupling device comprising a base body, a first drive and a connector element; and
a fifth wheel coupling plate having a semitrailer surface and an entry opening;
wherein the base body is configured to be fixed to the fifth wheel coupling arrangement and/or the trailer;
wherein the connector element is displaceable relative to the base body by the first drive in a displacement direction;
wherein the displacement direction is oriented such that the displacement direction is parallel to a direction of extension of the entry opening of the fifth wheel coupling plate; and
wherein the first drive comprises a hydraulic drive, an electric drive or a pneumatic drive.

2. The fifth wheel coupling arrangement according to claim 1, wherein the drive has an energy connection.

3. The fifth wheel coupling arrangement according to claim 1, wherein the first drive comprises a compressed air cylinder.

4. The fifth wheel coupling arrangement according to claim 1, wherein the first drive comprises a single-acting cylinder.

5. The fifth wheel coupling arrangement according to claim 1, wherein the primary coupling device comprises a second drive.

6. The fifth wheel coupling arrangement according to claim 5, wherein the first and second drives are arranged in parallel.

7. The fifth wheel coupling arrangement according to claim 5, wherein the connector element is displaceable only by the drive and/or by the second drive and/or by spring elements.

8. The fifth wheel coupling arrangement according to claim 1, wherein the connector element comprises hydraulic contacts and/or pneumatic contacts and/or electrical contacts.

9. A fifth wheel coupling arrangement, comprising:
a primary coupling device comprising a base body, a first drive and a connector element; and
a fifth wheel coupling plate having a semitrailer surface and an entry opening;
wherein the base body is configured to be fixed to the fifth wheel coupling arrangement and/or the trailer;
wherein the connector element is displaceable relative to the base body by the first drive in a displacement direction;
wherein the displacement direction is oriented such that the displacement direction is parallel to a direction of extension of the entry opening of the fifth wheel coupling plate; and
wherein the connector element and/or the base body is/are mounted movably in a direction perpendicular to the displacement direction.

10. The fifth wheel coupling arrangement according to claim 9, wherein the direction perpendicular to the displacement direction is normal to the semitrailer surface.

11. The fifth wheel coupling arrangement according to claim 10, wherein the connector element and/or the base body are movable by 5 mm.

12. The fifth wheel coupling arrangement according to claim 10, wherein the connector element and/or the base body is/are mounted pivotably in one direction about the normal.

13. The fifth wheel coupling arrangement according to claim 12, wherein the connector element and/or the base element is pivotable about the normal by a maximum of +/−10°.

14. The fifth wheel coupling arrangement according to claim 13, wherein the connector element and/or the base element is pivotable about the normal by a maximum of +/−5°.

15. A method for connecting power lines of a fifth wheel coupling arrangement and lines of a trailer, comprising:
providing the fifth wheel coupling arrangement, comprising;
a primary coupling device comprising a base body, a first drive and a connector element; and
a fifth wheel coupling plate having a semitrailer surface and an entry opening;
wherein the base body is configured to be fixed to the fifth wheel coupling arrangement and/or the trailer;
wherein the connector element is displaceable relative to the base body by the first drive in a displacement direction; and
wherein the displacement direction is oriented such that the displacement direction is parallel to a direction of extension of the entry opening of the fifth wheel coupling plate;
providing the semitrailer with a king pin and a secondary coupling device;

displacing the king pin from an uncoupled position to a coupled position relative to the fifth wheel coupling plate; and connecting the primary coupling device to the secondary coupling device;

wherein 0.1 to 0.5 seconds before the king pin is placed in the coupled position, the drive is activated and/or the primary coupling device is connected to the secondary coupling device.

16. The method according to claim 15, further comprising:

connecting the primary coupling device to the secondary coupling device, by actuating the drive, subsequent to displacing the king pin to the coupled position.

* * * * *